US010879726B2

(12) United States Patent
Aronov et al.

(10) Patent No.: US 10,879,726 B2
(45) Date of Patent: Dec. 29, 2020

(54) DEVICES AND METHODS FOR ADAPTIVE FAST-CHARGING OF MOBILE DEVICES

(71) Applicant: StoreDot Ltd., Herzeliya (IL)

(72) Inventors: Daniel Aronov, Netanya (IL); Leonid Krasovitsky, Rishon LeTzion (IL); Maxim Liberman, Haifa (IL); Vadim Sabayev, Rishon Lezion (IL); Leonid Spindler, Kfar Saba (IL); Alan Weisleder, Ganei Tikva (IL)

(73) Assignee: STOREDOT LTD., Hetzeliya (IL)

( * ) Notice: Subject to any disclaimer, the term of this patent is extended or adjusted under 35 U.S.C. 154(b) by 0 days.

(21) Appl. No.: 16/265,470

(22) Filed: Feb. 1, 2019

(65) Prior Publication Data
US 2019/0165592 A1    May 30, 2019

Related U.S. Application Data

(63) Continuation of application No. 14/574,409, filed on Dec. 18, 2014, now Pat. No. 10,256,650.

(51) Int. Cl.
*H02J 7/34* (2006.01)
*H02J 7/00* (2006.01)
*H01M 10/44* (2006.01)

(52) U.S. Cl.
CPC .............. *H02J 7/342* (2020.01); *H02J 7/007* (2013.01); *H01M 10/441* (2013.01);
(Continued)

(58) Field of Classification Search
CPC ...... B60L 11/1851; H02J 7/007; H02J 7/0054
See application file for complete search history.

(56) References Cited

U.S. PATENT DOCUMENTS 5,055,763 A    10/1991  Johnson et al.
5,057,761 A *  10/1991  Felegyhazi, Sr. ... H02J 7/00038
                                                      320/110
(Continued)

FOREIGN PATENT DOCUMENTS

CN        1533008       9/2004
CN      103701164       4/2014
(Continued)

OTHER PUBLICATIONS

Vlad et al., Hybrid supercapacitor-battery materials for fast electrochemical charge storage, Scientific Reports 4, Article No. 4315, Mar. 7, 2014.

(Continued)

*Primary Examiner* — Richard Isla
*Assistant Examiner* — Johali A Torres Ruiz
(74) *Attorney, Agent, or Firm* — Reches Patent (57) ABSTRACT

The present invention discloses devices and methods for adaptive fast-charging of mobile devices. Methods include the steps of: firstly determining whether a first connected component is charged; upon firstly determining the first connected component isn't charged, secondly determining whether the first connected component is adapted for rapid charging; and upon secondly determining the first connected component is adapted for rapid charging, firstly charging the first connected component at a high charging rate via a charging device. Preferably, the charging device is selected from the group consisting of: a rapid charger and a slave battery. Preferably, the first connected component is selected from the group consisting of: a mobile device and a slave battery. Preferably, the high charging rate is selected from the group consisting of: greater than about 4 C, greater than about 5 C, greater than about 10 C, greater than about 20 C, greater than about 30 C, and greater than about 60 C.

16 Claims, 9 Drawing Sheets

(52) U.S. Cl.
CPC ............ *H02J 7/0013* (2013.01); *H02J 7/0044* (2013.01); *H02J 7/0047* (2013.01)

(56) References Cited

U.S. PATENT DOCUMENTS

| | | | |
|---|---|---|---|
| 6,118,250 | A | 9/2000 | Hutchison, IV et al. |
| 6,216,480 | B1 | 4/2001 | Camus et al. |
| 6,242,888 | B1* | 6/2001 | Cerf ................. H02J 7/0027 320/119 |
| 6,445,159 | B1* | 9/2002 | Ramsden ............... H02J 9/062 320/119 |
| 7,656,120 | B2 | 2/2010 | Neu et al. |
| 7,956,576 | B2 | 6/2011 | Neu et al. |
| 2001/0017531 | A1 | 8/2001 | Sakakibara et al. |
| 2004/0155631 | A1 | 8/2004 | Ishizu |
| 2005/0052161 | A1 | 3/2005 | Scamard |
| 2005/0194934 | A1* | 9/2005 | Iijima ................. H01M 4/525 320/128 |
| 2008/0048621 | A1 | 2/2008 | Yun |
| 2008/0093143 | A1 | 4/2008 | Harrison |
| 2008/0143300 | A1 | 6/2008 | Yoshida |
| 2008/0224652 | A1 | 9/2008 | Zhu et al. |
| 2010/0007310 | A1 | 1/2010 | Kawamoto et al. |
| 2010/0066309 | A1 | 3/2010 | Labrunie et al. |
| 2010/0134065 | A1 | 6/2010 | Iida |
| 2010/0134305 | A1 | 6/2010 | Lu et al. |
| 2011/0084845 | A1 | 4/2011 | Krug |
| 2011/0156660 | A1 | 6/2011 | Cheng et al. |
| 2011/0260689 | A1 | 10/2011 | Kano |
| 2012/0145485 | A1 | 6/2012 | McCabe et al. |
| 2012/0319487 | A1* | 12/2012 | Shah ................. H02J 7/0068 307/66 |
| 2013/0088082 | A1 | 4/2013 | Kang |
| 2013/0229153 | A1 | 9/2013 | Sarkar et al. |
| 2014/0083443 | A1 | 3/2014 | Liu et al. |
| 2014/1014550 | | 5/2014 | Lu et al. |
| 2014/0195826 | A1 | 7/2014 | Wojcik et al. |
| 2015/0214762 | A1* | 7/2015 | Hung ................. H02J 5/005 320/107 |

FOREIGN PATENT DOCUMENTS

| | | |
|---|---|---|
| EP | 1453176 | 9/2004 |
| EP | 2590050 | 5/2013 |
| JP | 2008-154370 | 7/2008 |
| JP | 2010-104223 | 5/2010 |
| KR | 2004-0071636 | 8/2004 |
| WO | WO 2003/003667 | 1/2003 |
| WO | WO 2006/112698 | 10/2006 |
| WO | WO2015032950 | 3/2015 |

OTHER PUBLICATIONS

Kan et al., "Battery-Capacitor combinations in photovoltaic powered products", Journal of Power Sources, vol. 162, No. 2, pp. 971-974, Nov. 22, 2006.
Buiel et al., "Development of ultrathin ultracapacitors for enhanced lithium batteries in portable electronic applications", published at the Capacitor and Resistor Technology Symposium (CARTS International 2013), Mar. 26, 2013.
Office action for U.S. Appl. No. 15/678,143, dated Dec. 13, 2018.
Office action for U.S. Appl. No. 14/574,409, dated Mar. 30, 2016.
Office action for U.S. Appl. No. 14/574,409, dated Aug. 18, 2015.
Office action for U.S. Appl. No. 15/287,292, dated Dec. 15, 2017.
Office action for U.S. Appl. No. 15/678,143, dated Nov. 18, 2019.
European Search Report for EP patent application No. EP 15162300. 6, dated Jun. 17,2015.
Office action for CN patent application No. 201510161885.8, dated Nov. 4, 2016.
Office action for KR patent application No. 10-2015-0048259, dated May 30, 2016.

* cited by examiner

DEVICES AND METHODS FOR ADAPTIVE FAST-CHARGING OF MOBILE DEVICES

CROSS-REFERENCE TO RELATED APPLICATIONS

This application is a continuation of U.S. patent application Ser. No. 14/574,409, filed Dec. 18, 2014, entitled "Devices and Methods for Adaptive Fast-Charging of Mobile Devices" which is hereby incorporated by reference in its entirety.

FIELD AND BACKGROUND OF THE INVENTION

The present invention relates to devices and methods for adaptive fast-charging of mobile devices.

Modern electronic appliances are becoming ubiquitous for personal as well as business use. It cannot be overstated that with the evolution of such devices, mobility has emerged as a key driver in feature enhancement for technological innovation. While the rapid advancement of low power-consumption processors and flash-memory devices have enabled such mobility to reach new levels of real-world productivity, further development is significantly hampered by the rather slow progress made in battery technology. The proliferation of smart phones, tablets, laptops, ultrabooks, and the like (acquiring smaller and smaller form factors) has made this issue even more abundantly apparent as consumers are eager to have longer and longer device usage times between recharge cycles, without adding heft to the weight and footprint of such devices.

The demands of such applications vary widely, for example, in voltage or power level, but all are preferably served by lightweight, power-storage devices which can rapidly and consistently provide high energy density over long time spans, and can be quickly recharged to operational energy levels. To meet the growing demand in portable electronic device, energy storage devices with high specific energy, high power density, long cycle life, low cost, and a high margin of safety must be employed.

Currently, the dominant energy storage device remains the battery, particularly the lithium-ion battery. Lithium-ion batteries power nearly every portable electronic device, as well as almost every electric car. Batteries store energy electrochemically, in which chemical reactions release electrical carriers that can be extracted into an electrical circuit.

The charge and discharge processes in batteries are slow, and can degrade the chemical compounds inside the battery over time. A key bottleneck in achieving enhanced performance is the limited fast-charging ability of any standard battery. Rapid charging causes accelerated degradation of the battery constituents, as well as a potential fire hazard due to a localized, over-potential build-up and increased heat generation.

It would be desirable to have devices and methods for adaptive fast-charging of mobile devices. Such devices and methods would, inter alia, overcome the various limitations mentioned above.

SUMMARY

It is the purpose of the present invention to provide devices and methods for adaptive fast-charging of mobile devices.

It is noted that the term "exemplary" is used herein to refer to examples of embodiments and/or implementations, and is not meant to necessarily convey a more-desirable use-case. Similarly, the terms "preferred" and "preferably" are used herein to refer to an example out of an assortment of contemplated embodiments and/or implementations, and is not meant to necessarily convey a more-desirable use-case. Therefore, it is understood from the above that "exemplary" and "preferred" may be applied herein to multiple embodiments and/or implementations.

Preferred embodiments of the present invention enable adaptive fast-charging of mobile devices by a rapid charger and/or a slave battery.

Features of such adaptive fast-charging devices and methods include, inter alia, the following aspects.

Fast charging with and without an AC or DC power source

Adaptive charging intervals (via control of battery charging characteristics)

Standard working time

Battery lifetime improvement (via control of battery charging characteristics)

High current input allowed

Adaptive battery charging by controlling the charging current

Therefore, according to the present invention, there is provided a method for adaptive fast-charging of mobile devices, the method including the steps of: (a) firstly determining whether a first connected component is charged; (b) upon firstly determining the first connected component is not charged, secondly determining whether the first connected component is adapted for rapid charging; and (c) upon secondly determining the first connected component is adapted for rapid charging, firstly charging the first connected component at a high charging rate via a charging device.

Preferably, the charging device is selected from the group consisting of: a rapid charger and a slave battery.

Preferably, the first connected component is selected from the group consisting of: a mobile device and a slave battery.

Preferably, the high charging rate is selected from the group consisting of: greater than about 4 C, greater than about 5 C, greater than about 10 C, greater than about 20 C, greater than about 30 C, and greater than about 60 C.

Preferably, the method further includes the step of: (d) upon secondly determining the first connected component is not adapted for rapid charging, firstly charging the first connected component at a standard charging rate via the charging device.

Preferably, the method further includes the steps of: (d) thirdly determining whether a second connected component is charged; (e) upon thirdly determining the second connected component is not charged, fourthly determining whether the second connected component is adapted for rapid charging; and (f) upon fourthly determining the second connected component is adapted for rapid charging, secondly charging the second connected component at a high charging rate via the charging device.

Most preferably, the first connected component and the second connected component are selected from the group consisting of: a mobile device and a slave battery.

Most preferably, the first connected component is either directly or indirectly connected to the charging device via the second connected component.

Most preferably, the step of secondly charging is dependent on whether a sufficient charging time is available.

Most preferably, the method further includes the step of: (g) upon secondly determining the second connected component is not adapted for rapid charging, secondly charging the second connected component at a standard charging rate via the charging device.

According to the present invention, there is provided a rapid charger for adaptive fast-charging of mobile devices, the rapid charger including: (a) a rapid-charging module for determining whether a connected component allows rapid charging; and (b) a rapid-charging controller for supplying a high charging rate to enabled components adapted for rapid charging.

Preferably, the rapid-charging controller is configured to supply a standard charging rate to standard components not adapted for rapid charging.

Preferably, the high charging rate is selected from the group consisting of: greater than about 4 C, greater than about 5 C, greater than about 10 C, greater than about 20 C, greater than about 30 C, and greater than about 60 C.

According to the present invention, there is provided a slave battery for adaptive fast-charging of mobile devices, the slave battery including: (a) a rapid-charging module for determining whether a connected component allows rapid charging; and (b) a rapid-charging controller for supplying a high charging rate to enabled components adapted for rapid charging.

Preferably, the rapid-charging controller is configured to supply a standard current rate to standard components not adapted for rapid charging.

Preferably, the high charging rate is selected from the group consisting of: greater than about 4 C, greater than about 5 C, greater than about 10 C, greater than about 20 C, greater than about 30 C, and greater than about 60 C.

According to the present invention, there is provided a non-transitory computer-readable medium, having computer-readable code embodied on the non-transitory computer-readable medium, the computer-readable code having program code for adaptive fast-charging of mobile devices, the computer-readable code including: (a) program code for firstly determining whether a first connected component is charged; (b) program code for, upon firstly determining the first connected component is not charged, secondly determining whether the first connected component is adapted for rapid charging; and (c) program code for, upon secondly determining the first connected component is adapted for rapid charging, firstly charging the first connected component at a high charging rate via a charging device.

Preferably, the charging device is selected from the group consisting of: a rapid charger and a slave battery.

Preferably, the first connected component is selected from the group consisting of: a mobile device and a slave battery.

Preferably, the high charging rate is selected from the group consisting of: greater than about 4 C, greater than about 5 C, greater than about 10 C, greater than about 20 C, greater than about 30 C, and greater than about 60 C.

Preferably, the computer-readable code further includes: (d) program code for, upon secondly determining the first connected component is not adapted for rapid charging, firstly charging the first connected component at a standard charging rate via the charging device.

Preferably, the computer-readable code further includes: (d) program code for thirdly determining whether a second connected component is charged; (e) program code for, upon thirdly determining the second connected component is not charged, fourthly determining whether the second connected component is adapted for rapid charging; and (f) program code for, upon fourthly determining the second connected component is adapted for rapid charging, secondly charging the second connected component at a high charging rate via the charging device.

Most preferably, the first connected component and the second connected component are selected from the group consisting of: a mobile device and a slave battery.

Most preferably, the first connected component is either directly or indirectly connected to the charging device via the second connected component.

Most preferably, the secondly charging is dependent on whether a sufficient charging time is available.

Most preferably, the computer-readable code further includes: (g) upon secondly determining the second connected component is not adapted for rapid charging, secondly charging the second connected component at a standard charging rate via the charging device.

These and further embodiments will be apparent from the detailed description that follows.

BRIEF DESCRIPTION OF THE DRAWINGS

The present invention is herein described, by way of example only, with reference to the accompanying drawings, wherein.

DESCRIPTION OF THE PREFERRED EMBODIMENTS

The present invention relates to devices and methods for adaptive fast-charging of mobile devices. The principles and operation for providing such devices and methods, according to the present invention, may be better understood with reference to the accompanying description and the drawings.

(The "C rate" used below is defined as the current needed to fully charge a specific battery with capacity C in one hour. For example, a 1 C rate for a 2600 mAh battery corresponds to applying 2.6 A for one hour to fully charge the battery. Therefore, a 6 C rate for the same battery corresponds to applying 15.6 A for 10 minutes to fully charge the battery.)

Figure 1:
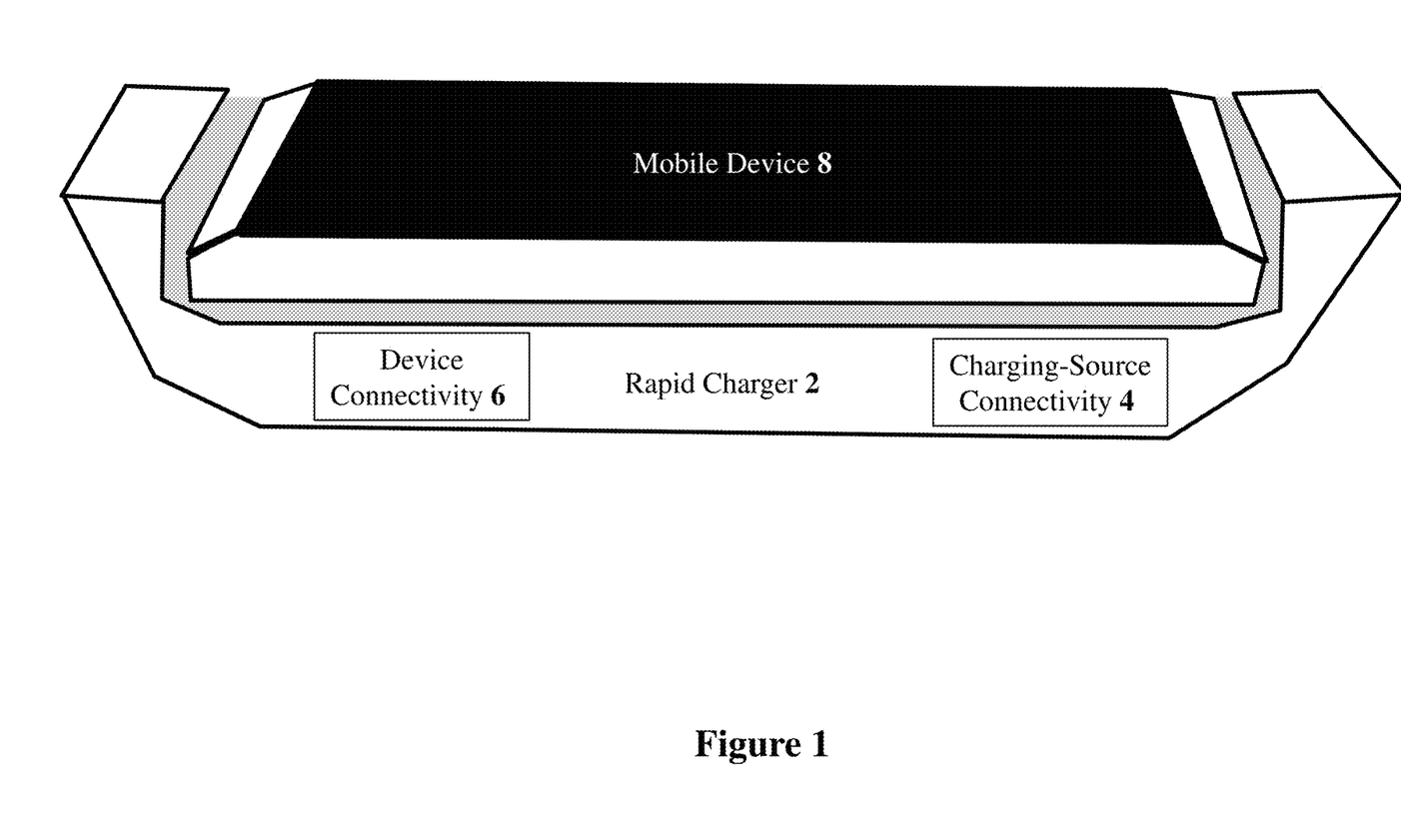
FIG. 1 is a simplified perspective side-view of an exemplary mobile device engaged with an exemplary rapid charger for adaptive fast-charging of mobile devices, according to preferred embodiments of the present invention.

Referring to the drawings, FIG. 1 is a simplified perspective side-view of an exemplary mobile device engaged with an exemplary rapid charger for adaptive fast-charging of mobile devices, according to preferred embodiments of the present invention. A rapid charger 2 is shown having a charging-source connectivity 4 and a device connectivity 6. Both charging-source connectivity 4 and device connectivity 6 are depicted schematically in FIG. 1. Charging-source connectivity 4 includes any operational connectivity to an AC power source (e.g., an electrical outlet) or a DC power source (e.g., a car adapter). Device connectivity 6 includes any operational connectivity for supplying charging capabilities and exchanging sensing data with mobile device 8 (e.g., a USB connection, a third-party connector, or a proprietary connector). Mobile device 8 includes smartphones, laptops, tablets, wireless peripherals (e.g., speakers, microphones, and displays), and wearable technology gadgets.

Figure 2:
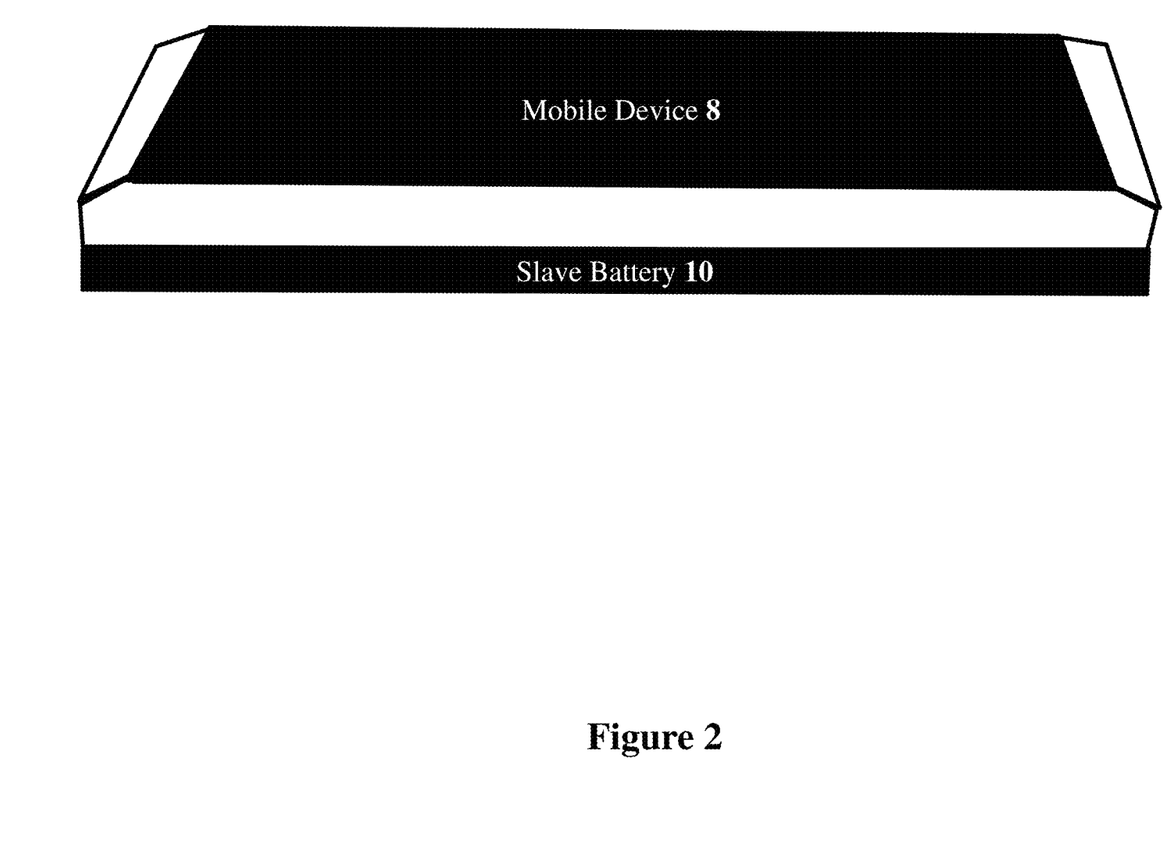
FIG. 2 is a simplified perspective side-view of the mobile device of FIG. 1 engaged with an exemplary slave battery for adaptive fast-charging of mobile devices, according to preferred embodiments of the present invention.

FIG. 2 is a simplified perspective side-view of the mobile device of FIG. 1 engaged with an exemplary slave battery for adaptive fast-charging of mobile devices, according to preferred embodiments of the present invention. Mobile device 8 is shown operationally connected to a slave battery 10.

Figure 3:
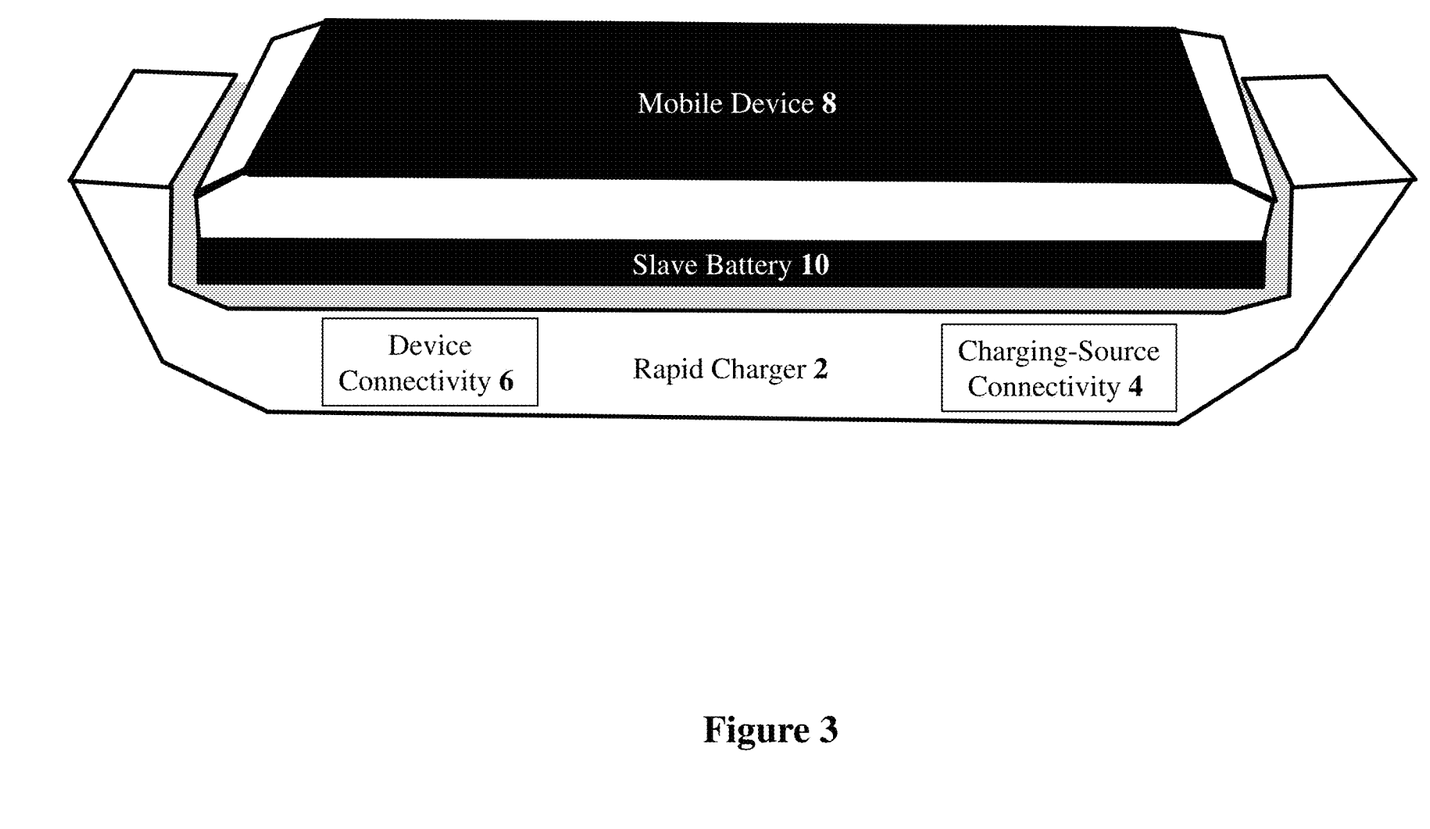
FIG. 3 is a simplified perspective side-view of the mobile device and the slave battery of FIG. 2 further engaged with the rapid charger of FIG. 1, according to preferred embodiments of the present invention.

FIG. 3 is a simplified perspective side-view of the mobile device and the slave battery of FIG. 2 further engaged with the rapid charger of FIG. 1, according to preferred embodiments of the present invention. Mobile device 8 and slave battery 10 are shown operationally connected to rapid charger 2. Both mobile device 8 and slave battery 10 may include a fast-charging battery to enable rapid charger 2 to supply high currents in order to enable fast-charging of the components.

With regard to high currents, in the context of state-of-the-art charging of mobile devices, current charging schemes operate below 2 C. Higher currents can have several detrimental effects on the mobile device and its battery if not properly taken into consideration. For example, the interface connectors for the device connectivity for supplying high currents need to be able to handle the thermal load of higher currents. Moreover, battery lifetimes can be shortened drastically if charging occurs too rapidly with most standard types of battery configurations. Thus, fast-charging capabilities depend on the configuration of interface connectors, the type of battery employed, and the configuration of the charger itself. Rapid charger 2 of FIG. 1 is intended to provide adaptive fast-charging of mobile devices by detecting the appropriate charging conditions allowable for the connected components, and charging the components accordingly—either under standard- or rapid-charging conditions and protocols.

As intended herein, high currents generally correspond to charging rates of greater than about 2 C. In other embodiments, a charging rate greater than about 4 C is preferred. In still other embodiments, a charging rate greater than about 5 C is preferred. In some other embodiments, a charging rate greater than about 10 C is preferred. In further embodiments, a charging rate greater than about 20 C is preferred. In still further embodiments, a charging rate greater than about 30 C is preferred. In even further embodiments, a charging rate greater than about 60 C is preferred.

Figure 4:
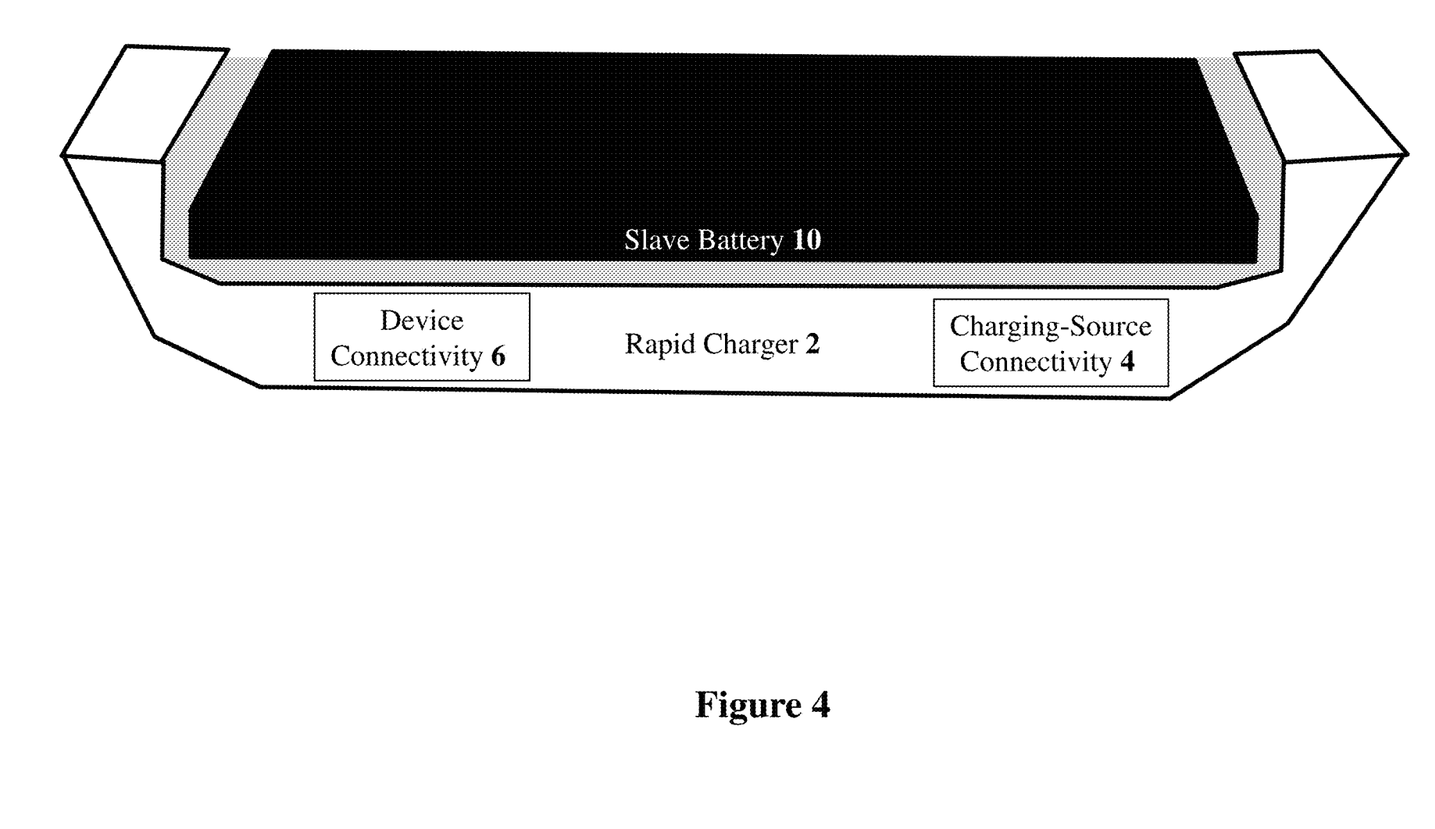
FIG. 4 is a simplified perspective side-view of the slave battery of FIG. 2 solely engaged with the rapid charger of FIG. 1, according to preferred embodiments of the present invention.

FIG. 4 is a simplified perspective side-view of the slave battery of FIG. 2 solely engaged with the rapid charger of FIG. 1, according to preferred embodiments of the present invention. Slave battery 10 is shown operationally connected to rapid charger 2 by itself, allowing slave battery 10 to be independently charged without mobile device 8.

Figure 5:
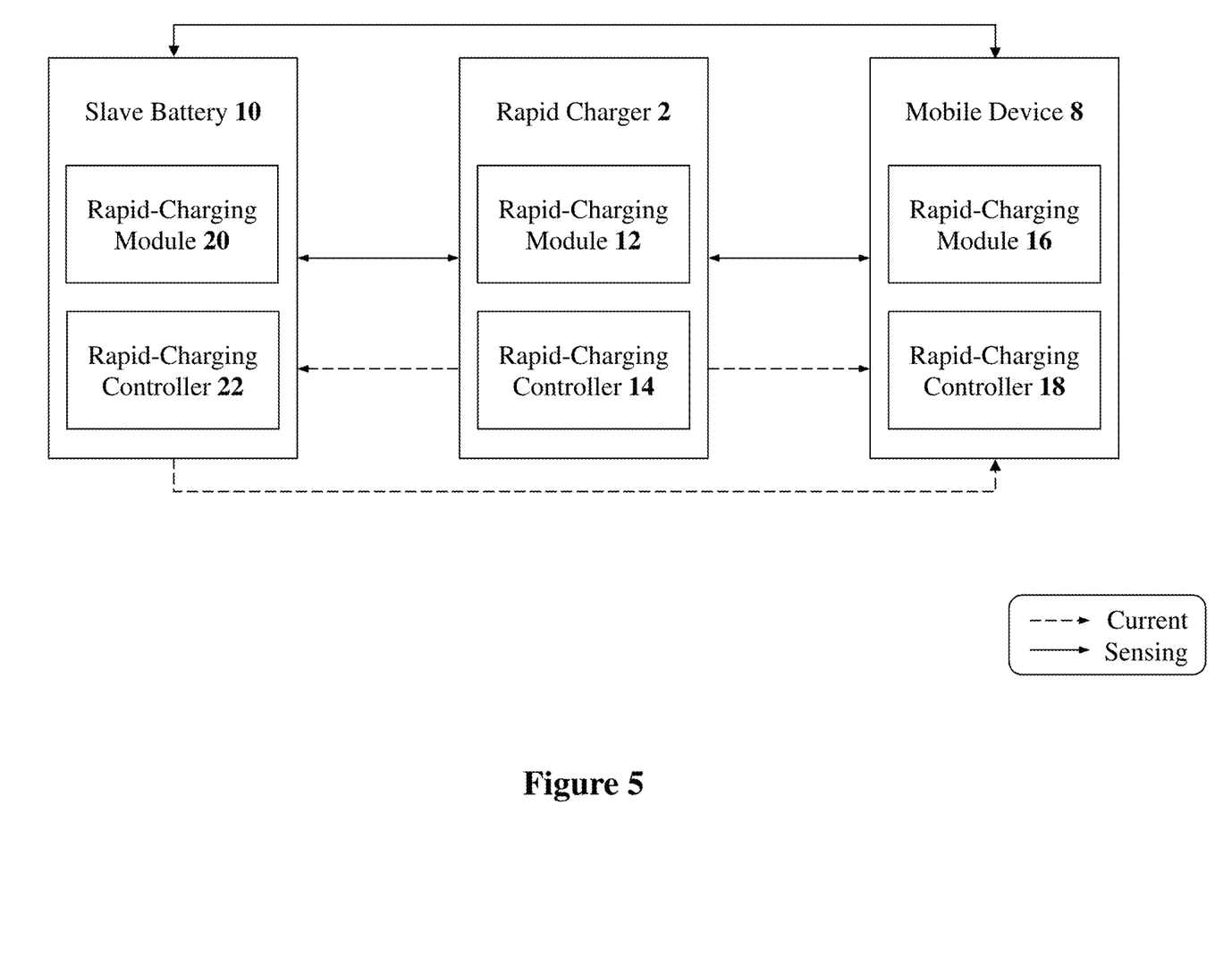
FIG. 5 is a simplified high-level schematic diagram of the device architecture for adaptive fast-charging of mobile devices, according to preferred embodiments of the present invention.

FIG. 5 is a simplified high-level schematic diagram of the device architecture for adaptive fast-charging of mobile devices, according to preferred embodiments of the present invention. Rapid charger 2 of FIG. 1 is shown having a rapid-charging module 12 and a rapid-charging controller 14. Mobile device 8 of FIG. 1 is shown having a rapid-charging module 16 and a rapid-charging controller 18. Slave battery 10 of FIG. 2 is shown having a rapid-charging module 20 and a rapid-charging controller 22.

The rapid-charging modules determine whether the connected components are adapted for rapid charging. The rapid-charging controllers supply high charging rates to enabled components adapted for rapid charging, as well as standard charging rates to standard components not adapted for rapid charging. In the case of mobile device 8, rapid-charging module 16 validates an enabled component to a rapid charger or a slave battery, while rapid-charging controller 18 handles both high-charging and standard-charging rates. Arrows are shown in FIG. 5 depicting transmission direction of current and sensing data among the components.

Figure 6:
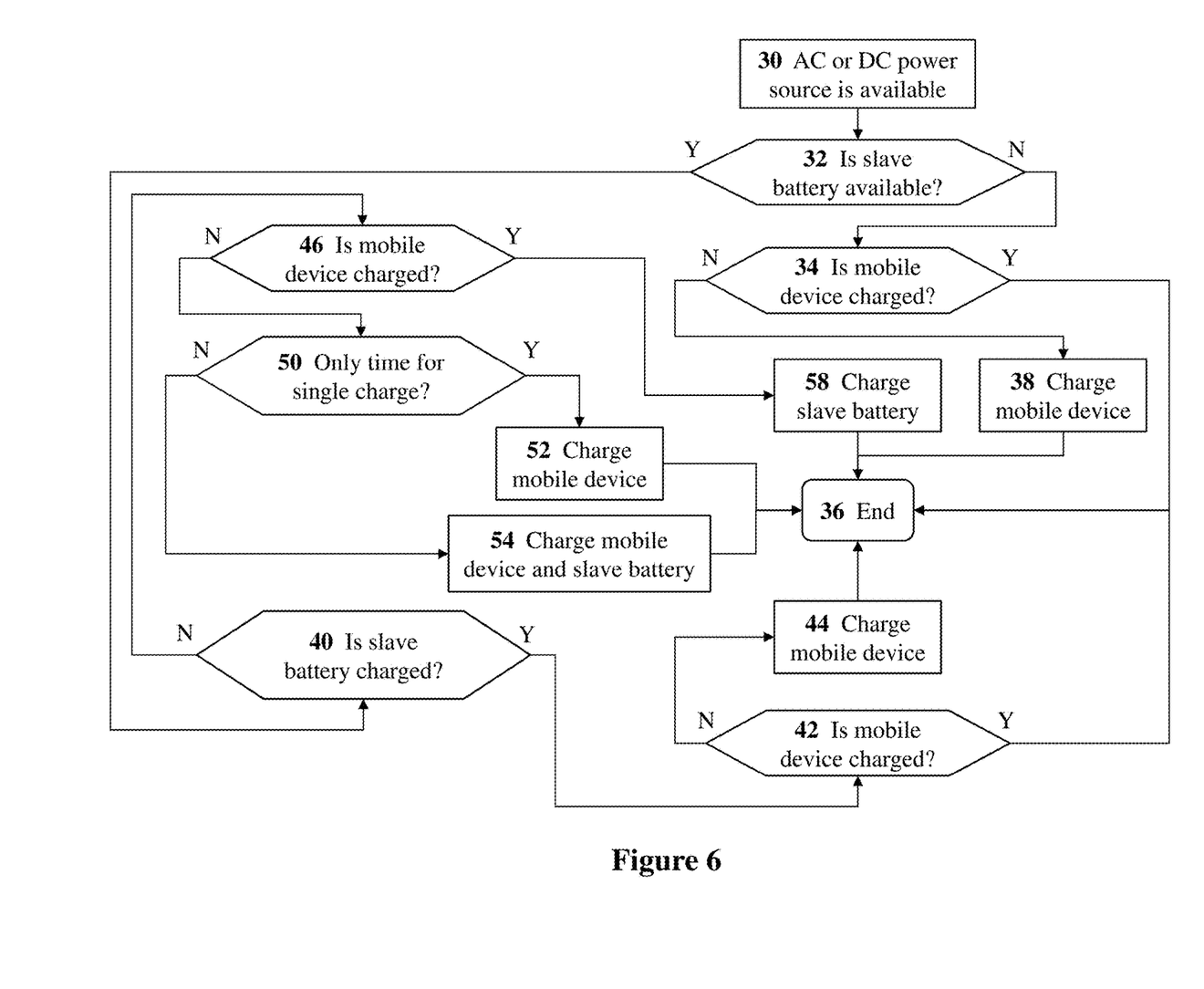
FIG. 6 is a simplified flowchart of the major process steps for adaptive fast-charging of mobile devices from a rapid charger, according to preferred embodiments of the present invention.

FIG. 6 is a simplified flowchart of the major process steps for adaptive fast-charging of mobile devices from a rapid charger, according to preferred embodiments of the present invention. The process starts when a component is operationally connected to an AC or DC power source via the rapid charger (Step 30). The system determines whether a slave battery is available (Step 32). If a slave battery is not available, the system determines whether the mobile device is charged (Step 34). If the mobile device is charged, the process ends (Step 36). If the mobile device is not charged, then the rapid charger charges the mobile device (Step 38), and the process ends (Step 36). As intended herein, the term "charged" is used to refer to a full charge of a component. The term "not charged" is used to refer to any charge state other than a full charge of a component.

If a slave battery is available in Step 32, the system determines whether the slave battery is charged (Step 40). If the slave battery is charged, the system determines whether the mobile device is charged (Step 42). If the mobile device is charged, the process ends (Step 36). If the mobile device is not charged, then the rapid charger charges the mobile device (Step 44), and the process ends (Step 36).

If the slave battery is not charged in Step 40, the system determines whether the mobile device is charged (Step 46). If the mobile device is charged, the rapid charger charges the slave battery (Step 58), and the process ends (Step 36). If the mobile device is not charged, then the system determines whether there is only time for a single charge, inter alia, by querying the user or receiving input from the charging source via the rapid charger (Step 50). If there is only time for a single charge, then the rapid charger charges the mobile device (Step 52), and the process ends (Step 36). If there is time for more than a single charge, then the rapid charger charges the mobile device and the slave battery (Step 54), and the process ends (Step 36).

Figure 7:
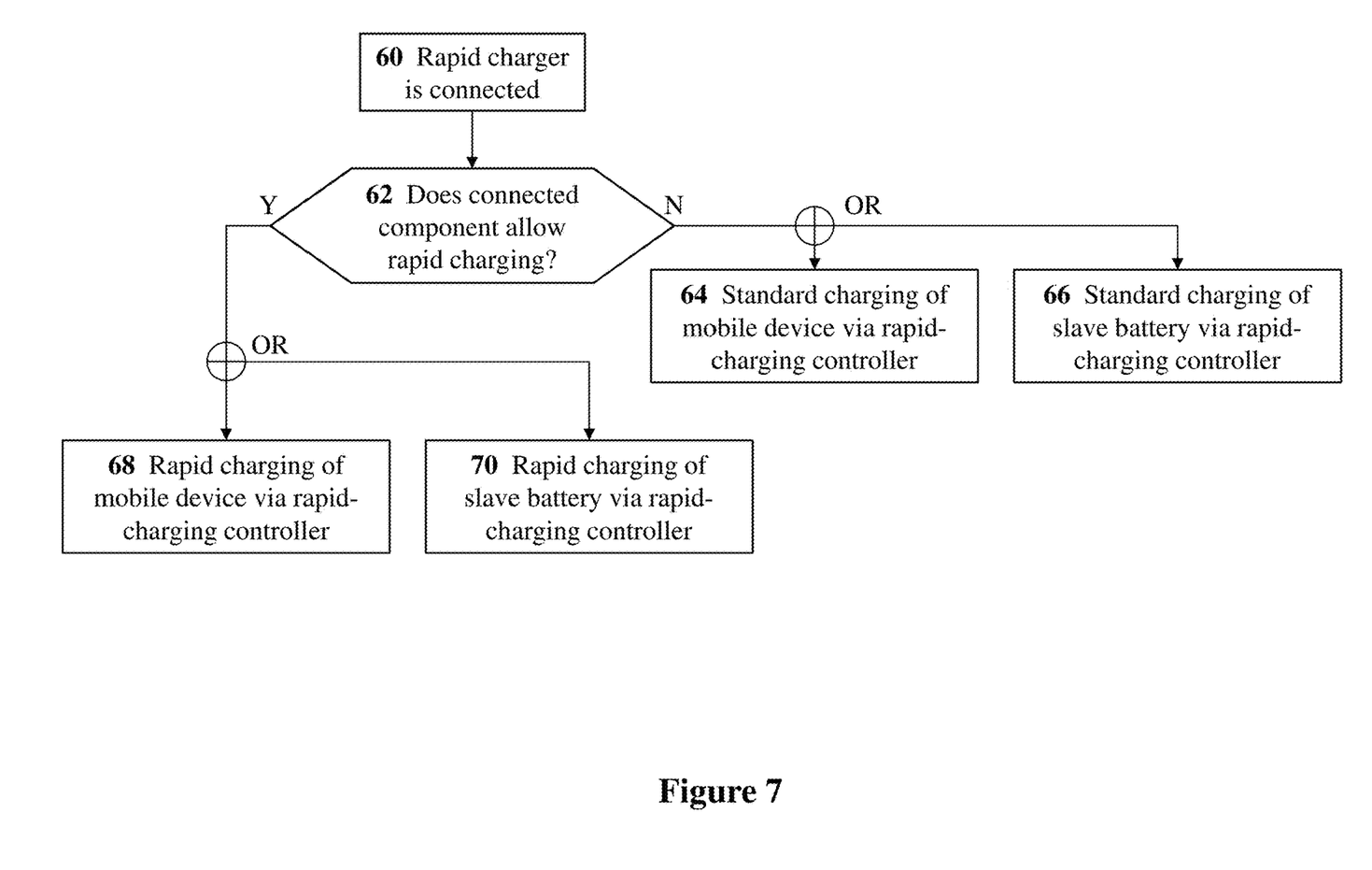
FIG. 7 is a simplified flowchart of the major process steps of a rapid-charging controller for adaptive fast-charging of mobile devices from a rapid charger, according to preferred embodiments of the present invention.

FIG. 7 is a simplified flowchart of the major process steps of a rapid-charging controller for adaptive fast-charging of mobile devices from a rapid charger, according to preferred embodiments of the present invention. The process starts when a component is operationally connected to an AC or DC power source via the rapid charger (Step 60). The system determines whether the connected component (i.e., mobile device and/or slave battery) allow rapid charging (Step 62). If the connected component doesn't allow rapid charging, then standard charging of the mobile device via the rapid-charging controller is enabled (Step 64), or standard charging of the slave battery via the rapid-charging controller is enabled (Step 66). If the connected component allows rapid charging, then rapid charging of the mobile device via the rapid-charging controller is enabled (Step 68), or rapid charging of the slave battery via the rapid-charging controller is enabled (Step 70).

Figure 8:
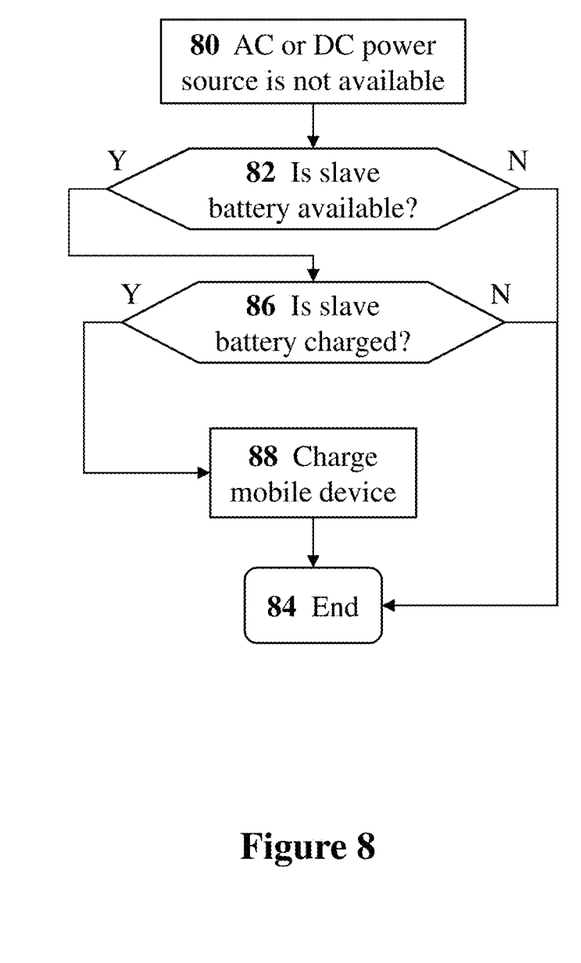
FIG. 8 is a simplified flowchart of the major process steps for adaptive fast-charging of mobile devices from a slave battery, according to preferred embodiments of the present invention.

FIG. 8 is a simplified flowchart of the major process steps for adaptive fast-charging of mobile devices from a slave battery, according to preferred embodiments of the present invention. The process starts when a mobile device is not connected to an AC or DC power source (Step 80). The system determines whether a slave battery is available (Step 82). If a slave battery is not available, then the process ends (Step 84). If a slave battery is available, then the system determines whether the slave battery is charged (Step 86). If the slave battery isn't charged, then the process ends (Step 84). If the slave battery is charged, then the mobile device is charged via the slave battery (Step 88), and the process ends (Step 84).

Figure 9:
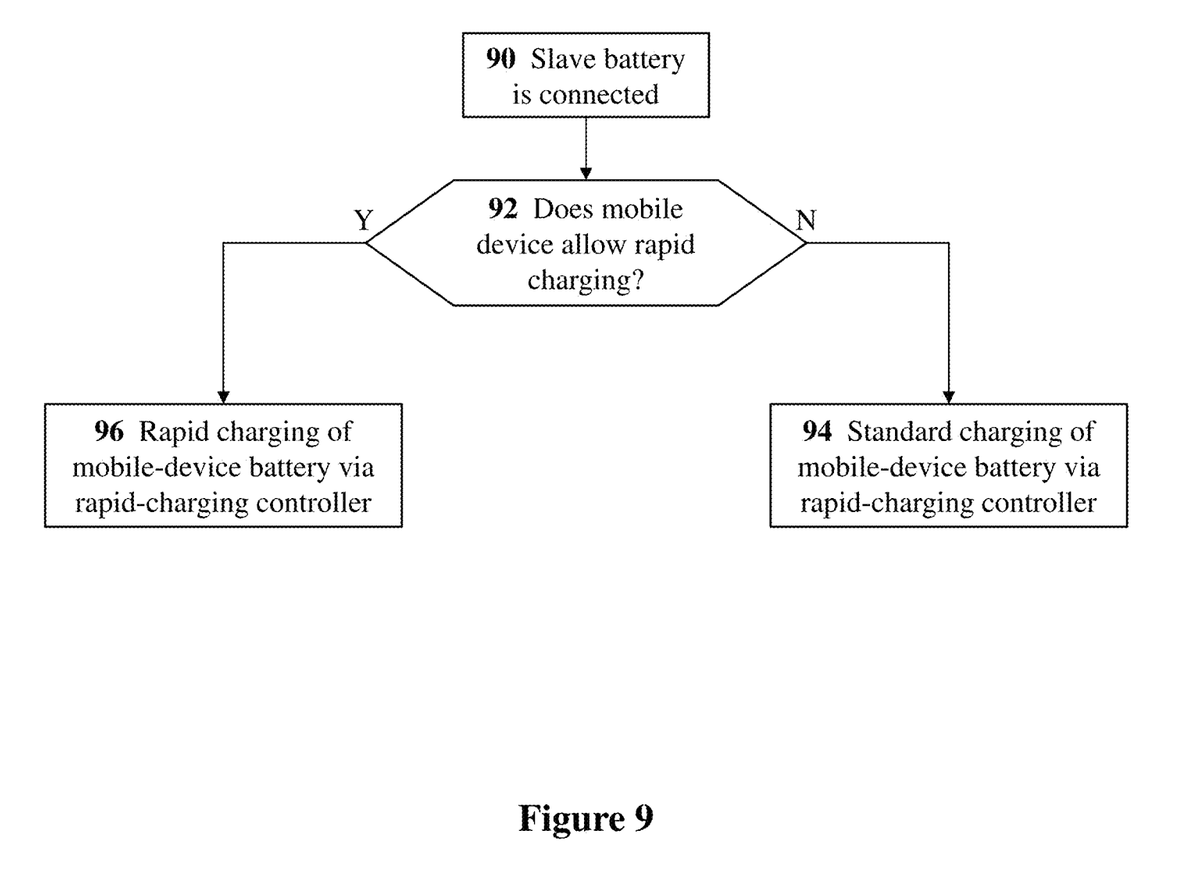
FIG. 9 is a simplified flowchart of the major process steps of a rapid-charging controller for adaptive fast-charging of mobile devices from a slave battery, according to preferred embodiments of the present invention.

FIG. 9 is a simplified flowchart of the major process steps of a rapid-charging controller for adaptive fast-charging of mobile devices from a slave battery, according to preferred embodiments of the present invention. The process starts when a slave battery is connected to a mobile device (Step 90). The system determines whether the mobile device allows rapid charging (Step 92). If the mobile device doesn't allow rapid charging, then standard charging of the mobile device via the slave battery is enabled (Step 94). If the mobile device allows rapid charging, then rapid charging of the mobile device via the slave battery is enabled (Step 96).

While the present invention has been described with respect to a limited number of embodiments, it will be appreciated that many variations, modifications, and other applications of the present invention may be made.

What is claimed is:

1. A computer-program product including a non-transitory computer-readable medium containing program instructions for causing a fast charger to perform adaptive fast-charging of mobile devices, the program instructions comprising:
   determining by the fast charger (a) whether a slave battery is available, (b) whether the slave battery is charged, (c) whether a mobile device is charged, (d) whether there is only time for a single charge; and (e) whether the mobile device is adapted to allow rapid charging, wherein the rapid charging involves charging at a rapid charging rate greater than 10 C;
   rapid charging, by the rapid charger, the mobile device when the slave battery is available and is not charged, the mobile device is not charged and is adapted to allow the rapid charging, and there is only time for the single charge, and
   rapid charging, by the rapid charger, the mobile device and the slave battery when the slave battery is available and is not charged, the mobile device is not charged and is adapted to allow the rapid charging, and there is time for more than a single charge.

2. The computer-program product of claim 1, wherein said rapid charging rate is greater than about 20 C.

3. The computer-program product of claim 1, wherein the determining whether there is only time for a single charge is based on input received from a charging source.

4. The computer-program product of claim 1, wherein said slave battery is either directly or indirectly connected to said charging device via the mobile device.

5. The computer-program product of claim 1, wherein the determining comprises querying a user.

6. The computer-program product of claim 1, containing instructions for charging the mobile device at a charging rate lower than the rapid charging rate when the mobile device is not adapted for the rapid charging.

7. A rapid charger that is connectable to a charging source and is configured to adaptively fast-charge a mobile device using a slave battery, the rapid charger comprising: a rapid charging module and a rapid-charging controller;
   wherein the rapid charging module is configured to determine (a) whether the slave battery is available, (b) whether the slave battery is charged, (c) whether the mobile device is charged, (d) whether there is only time for a single charge; and (e) whether the mobile device is adapted to allow rapid charging, wherein the rapid charging involves charging at a rapid charging rate greater than 10 C, and
   wherein the rapid-charging controller is configured to rapid charge the mobile device when the slave battery is available and is not charged, the mobile device is not charged and is adapted to allow the rapid charging, and there is only time for the single charge, and
   wherein the rapid-charging controller is also configured to rapid chare the mobile device and the slave battery when the slave battery is available and is not charged, the mobile device is not charged and is adapted to allow the rapid charging, and there is time for more than a single charge.

8. The rapid charger of claim 7, wherein the slave battery is charged from the power source and the mobile device is charged from the power source and/or from the slave battery, wherein at least the slave battery is used for charging the mobile device in case the mobile device is adapted to allow the rapid charging.

9. The rapid charger according to claim 7 wherein the rapid charging module is configured to determine whether there is only time for the single charge based on input from the charging source.

10. The rapid charger according to claim 7 wherein the rapid charging module is configured to determine whether there is only time for the single charge by querying a user.

11. The rapid charger according to claim 7 wherein the rapid-charging controller is configured to charge the mobile phone at a charging rate that is lower than the rapid charging rate, when the mobile phone is not adapted for rapid charging.

12. The rapid charger of claim 7, wherein the rapid-charging controller is further configured to rapid charge the mobile phone at a rapid charging rate that is based on a predefined charging time.

13. The rapid charger of claim 7, wherein the rapid-charging controller is configured to supply a standard charging rate to the mobile phone when the mobile phone is not adapted for rapid charging.

14. The rapid charger of claim 7, wherein the rapid charging rate exceeds 20 C.

15. The rapid charger of claim 7, wherein the rapid charging rate exceeds 30 C.

16. The rapid charger of claim 7, wherein the rapid charging rate exceeds 60 C.

\* \* \* \* \*